US012201122B2

(12) United States Patent
Aydin (10) Patent No.: US 12,201,122 B2
(45) Date of Patent: Jan. 21, 2025

(54) CANDY COATED WITH APPLE WAX

(71) Applicant: Katjes Fassin GmbH. + Kommanditgesellschaft, Emmerich (DE)

(72) Inventor: Bülent Aydin, Emmerich (DE)

(73) Assignee: Katjes Fassin GmbH. + Co. Kommanditgesellschaft, Emmerich (DE)

( * ) Notice: Subject to any disclaimer, the term of this patent is extended or adjusted under 35 U.S.C. 154(b) by 443 days.

(21) Appl. No.: 17/284,248

(22) PCT Filed: Oct. 10, 2019

(86) PCT No.: PCT/EP2019/077531
§ 371 (c)(1),
(2) Date: Apr. 9, 2021

(87) PCT Pub. No.: WO2020/074668
PCT Pub. Date: Apr. 16, 2020

(65) Prior Publication Data
US 2021/0352930 A1     Nov. 18, 2021

(30) Foreign Application Priority Data
Oct. 10, 2018   (DE) .......................... 102018217341.9

(51) Int. Cl.
| A23G 3/34 | (2006.01) |
| A23G 3/40 | (2006.01) |
| A23G 3/48 | (2006.01) |
| A23G 3/54 | (2006.01) |

(52) U.S. Cl.
CPC .............. *A23G 3/343* (2013.01); *A23G 3/40* (2013.01); *A23G 3/48* (2013.01); *A23G 3/54* (2013.01)

(58) Field of Classification Search
None
See application file for complete search history.

(56) References Cited

U.S. PATENT DOCUMENTS

| 5,389,129 A | 2/1995 | Jordan |
| 5,587,174 A | 12/1996 | Lang et al. |
| 2002/0037882 A1 | 3/2002 | Beindorff et al. |
| 2009/0123583 A1 | 5/2009 | Wiesmuller et al. |
| 2009/0202683 A1 | 8/2009 | Matteson et al. |
| 2015/0223477 A1 | 8/2015 | Vander Stichele et al. |
| 2017/0135367 A1 | 5/2017 | Aydin |
| 2018/0020691 A1 | 1/2018 | Aydin et al. |

FOREIGN PATENT DOCUMENTS

| DE | 872149 C | 3/1953 | |
| DE | 4004688 A1 | 8/1991 | |
| DE | 102007031747 A1 | 3/2008 | |
| DE | 102014009321 A1 | 12/2015 | |
| DE | 102018217342 A1 * | 4/2020 | ............ A21D 13/28 |
| JP | 2002020281 A | 1/2002 | |
| JP | 2007514727 A | 6/2007 | |
| JP | 2016032465 A | 3/2016 | |
| WO | 9317083 A1 | 9/1993 | |
| WO | 2005058302 A1 | 6/2005 | |
| WO | 2016113318 A1 | 7/2016 | |

OTHER PUBLICATIONS

Skaziel et al. "Fruit Cuticular waxes as a source of biologically active triterpenoids" Phytochem Rev (2012)11:263-284. (Year: 2012).*
Written Opinion of the International Searching Authority: European Patent Office; International Application No. PCT/EP2019/077531; Jan. 17, 2020; 9 pages.
Kripp, Thomas C.; Apfelwachs; Römpp Lexikon Chemie; Aug. 2010; 12 pages; Thieme.
International Preliminary Report on Patentability; The International Bureau of WIPO; International Application No. PCT/EP2019/077531; Apr. 22, 2021; 7 pages.
Japanese Office Action; Japan Patent Office; Japanese Application No. 2021-518722; Aug. 21, 2023; 15 pages.
International Search Report; European Patent Office; International Application No. PCT/EP2019/077531; Jan. 17, 2020; 5 pages.
Office Action; China National Intellectual Property Administration; Chinese Patent Application No. 2019800821589; Sep. 28, 2023; 3 pages.
Office Action; Japanese Patent Office; Japanese Patent Application No. 2021-518722; Feb. 1, 2024; 12 pages.

* cited by examiner

*Primary Examiner* — Jyoti Chawla
(74) *Attorney, Agent, or Firm* — Taft Stettinius & Hollister LLP (57) ABSTRACT

The present invention relates to a confectionery comprising a core and an outer surface bounding the core, wherein at least part of the outer surface of the core is coated with a coating agent, characterized in that the coating agent comprises apple wax. The invention further relates to a process for producing a confectionery, to the confectionery obtainable by this process, and to the use of apple wax.

7 Claims, 3 Drawing Sheets

CANDY COATED WITH APPLE WAX

CROSS-REFERENCE TO RELATED APPLICATIONS

This application is a U.S. National Phase of International PCT Application No. PCT/EP2019/077531 filed Oct. 10, 2019, which claims priority to German Patent Application No. 102018217341.9 filed Oct. 10, 2018, the contents of each application are incorporated herein by reference in their entirety.

The present invention relates to a confectionery comprising a core and an outer surface bounding the core, wherein at least part of the outer surface of the core, preferably the entire outer surface of the core, is coated with a coating agent, to a process for producing a confectionery, to the confectionery obtainable by this process, and to the use of apple wax.

Confectioneries are widespread and generally well-liked luxury food. One way of producing confectioneries that is generally known in the prior art involves pouring a liquid confectionery precursor mass into a one-part or multi-part mold. Confectioneries produced in this general manner in the prior art include fat-containing confectioneries and confectioneries made from a sugar mass (sugar confectioneries). An example of a fat-containing confectionery is chocolate. Confectioneries made from a sugar mass include candies. Among candies, a distinction is made between hard candies and soft candies. Hard candies also include medically active candies such as cough drops. If a hard candy is provided with a stick by which it is held, it is called a lollipop. Examples of soft candies include fruit gums, licorice, toffees, and chewy candies.

Candies can be produced by means of stamping machines or by pouring a candy precursor mass into a mold made of metal, of rubber-coated metal, of rubber or of a dimensionally stable plastic and then hardening the mass. Examples of suitable processes for the production of such a candy are described in DE 872 149 C, DE 872 149 C, DE 10 2007 031 747 A1 or DE 40 04 688 A1.

In order to prevent candies, in particular fruit gums, from sticking to one another during later storage, they are usually coated with a coating agent that also gives the surface of fruit gums the desired gloss. In addition, coating agents also improve the shelf life and strength of foodstuffs.

The use of a mixture of vegetable oil, antioxidants, and wax as a coating agent for foodstuffs is known from the prior art, the wax used normally being beeswax (E 901), candelilla wax (E 902; a natural substance extracted from the leaves of a Mexican desert plant), carnauba wax (E 903; a natural substance obtained from the leaf surface of a wax palm), shellac (E 904; a natural resin made from gum-lac, which is in turn obtained from the excretions of lac insects) or mixtures of these waxes. In the case of confectioneries such as fruit candy, beeswax is particularly suitable as a constituent of the coating agent.

It is an overall object of the present invention to at least partially overcome a drawback arising from the prior art. A particular object of the invention is to provide preferably vegan confectioneries that are coated with a coating agent and that, compared to confectioneries coated with beeswax and/or carnauba wax known from the prior art, have a reduced tendency to stick together and thus also have improved storage stability. A further object of the present invention is to provide preferably vegan confectioneries that are coated with a coating agent and in which the coating agent has a less pronounced influence on the color of the confectioneries than coating agents comprising beeswax and/or carnauba wax known from the prior art. A further object of the present invention is to provide preferably vegan confectioneries that are coated with a coating agent and that, compared to confectioneries known from the prior art in which beeswax and/or carnauba wax are a constituent of the coating agent, have improved thermal stability. Also underlying the present invention was the object of providing preferably vegan confectioneries that are coated with a coating agent and that, compared to sugar confectioneries known from the prior art in which beeswax and/or carnauba wax are a constituent of the coating agent, have improved gloss. An object of the invention is also to provide preferably vegan confectioneries that are coated with a wax and that, compared to confectioneries coated with beeswax and/or carnauba wax known from the prior art, are coated with less wax and yet have comparable gloss and/or a comparable tendency to stick together. Additionally underlying the present invention was the object of providing preferably vegan confectioneries that are coated with a coating agent and in which, compared to confectioneries known from the prior art in which beeswax and/or carnauba wax are a constituent of the coating agent, a sealing of the surface by the coating agent is improved, and the food accordingly has even greater protection against losses of odor, taste, and moisture.

A contribution to the at least partial achievement of at least one of these objects is made by the independent claims. The dependent claims provide preferred embodiments that contribute to the at least partial achievement of at least one of these objects.

A contribution to the achievement of at least one of the objects of the invention is made by a confectionery comprising a core and an outer surface bounding the core, wherein at least part of the outer surface of the core, preferably the entire outer surface of the core, is coated with a coating agent,
characterized in that the coating agent comprises apple wax.

Suitable as the shape for the core are all shapes known to those skilled in the art for a confectionery, preferably a sugar confectionery, even more preferably a candy. In a preferred embodiment of the core, the surface includes a relief on at least one side of the core. A preferred relief comprises a stamped pattern or a stamped figurative representation or both. A preferred figurative representation comprises one selected from the group consisting of a character, a letter, a number, and a three-dimensional portrayal or a combination of at least two thereof. A preferred three-dimensional portrayal is a portrayal of one selected from the group consisting of an object, a means of transport, a living being, a food, a foodstuff, and a constituent of any of said items or a combination of at least two thereof. A preferred means of transport is one selected from the group consisting of a train, an automobile, and an airplane or a combination of at least two thereof. A preferred living being is one selected from the group consisting of a human, an animal, and a plant or a combination of at least two thereof. A preferred food is a fruit. A preferred foodstuff is a fruit. It is of no importance here how lifelike, distorted or idealized the three-dimensional portrayal is compared to a model.

The confectionery of the invention is preferably a sugar confectionery, in particular a candy, very particularly preferably a soft candy, for example a chewy candy, a fruit gum or a toffee, or a hard candy, for example a cough drop or a lollipop.

A soft candy has a highly viscous, chewy consistency. Soft candies are by preference chewed when consumed. During chewing, the soft candy tends to dissolve gradually.

A soft candy can have a water content within a range from 1% to 20% by weight, from 5% to 20% by weight, from 10% to 20% by weight or from 15% to 20% by weight, in each case based on the total weight of the soft candy. A preferred soft candy is elastically deformable. A particularly preferred soft candy has a Shore hardness A of 70 or less, preferably of 65 or less, more preferably 60 or less, more preferably of 55 or less, more preferably of 50 or less, more preferably of 45 or less, more preferably of 40 or less, more preferably of 35 or less, more preferably of 30 or less, more preferably of 25 or less, more preferably of 20 or less, even more preferably of 20 or less, even more preferably of 15 or less, most preferably of 10 or less. Another preferred soft candy is one selected from the group consisting of a fruit gum, a wine gum, a toffee, and a chewy candy or a combination of at least two thereof. Another preferred soft candy comprises a hydrocolloid. A preferred hydrocolloid is gelatin. A particularly preferred soft candy does not contain any ingredients of animal origin and is therefore vegan. In addition, it is preferable that the soft candy of the invention has a content of theobromine or of a theobromine derivative of less than 0.5 g per kg soft candy, preferably less than 0.2 g per kg soft candy, and more preferably less than 0.1 g per kg soft candy. It is further preferable that the soft candy of the invention does not contain any theobromine or a theobromine derivative. It is additionally preferable that cocoa butter is present in the soft candy of the invention in a content of less than 15% by weight of soft candy, preferably in a content of less than 5% by weight of soft candy, further preferably in a content of less than 0.1% by weight of soft candy. It is further preferable that the soft candy of the invention does not contain any cocoa butter.

A hard candy is preferably hard and brittle. A preferred hard candy is not elastically deformable. A preferred hard candy comprises a glass-like structure. Another preferred hard candy has a water content within a range from 1% to 4% by weight, preferably within a range from 1% to 3% by weight, based on the total weight of the hard candy. Hard candies are by preference sucked when consumed. They are also known as boiled sweets. The term hard candy also includes hard candies with a stick, which are called lollipops. A very particularly preferred hard candy has a Shore hardness A of greater than 70, preferably greater than 75, more preferably greater than 80, more preferably greater than 85, more preferably greater than 90, even more preferably greater than 95, most preferably 100. Another preferred hard candy is hygroscopic. Another preferred hard candy has a GF value of less than 30%. Another preferred hard candy does not contain any gelatin.

A confectionery is produced from a confectionery precursor mass comprising as an essential constituent a sugar or a sugar substitute or both. A preferred sugar is one selected from the group consisting of a polysaccharide, sucrose, glucose, fructose, and invert sugar or a combination of at least two thereof. A preferred sugar substitute is one selected from the group consisting of isomalt, mannitol, sorbitol, xylitol, and polydextrose or a combination of at least two thereof. Another preferred confectionery precursor mass further comprises one selected from the group consisting of a milk preparation, a vegetable fat, an emulsifier, a color mixture, an oil, an active substance, a plant extract and a flavoring or a combination of at least two thereof. A preferred oil is an essential oil. A preferred essential oil is one selected from the group consisting of a *Eucalyptus* oil, a mint oil, and a menthol or a combination of at least two thereof. A preferred active substance has one selected from the group consisting of an expectorant effect, an analgesic effect, a swelling-relieving effect, and an anti-inflammatory effect or a combination of at least two thereof. A preferred plant extract is one selected from the group consisting of a herbal extract, a root extract, and a bark extract or a combination of at least two thereof. A preferred herbal extract is an extract from one selected from the group consisting of sage, buckhorn plantain, cowslip, and mallow or a combination of at least two thereof. A preferred root extract is licorice root extract, often referred to simply as licorice. A preferred flavoring is a synthetic flavoring or a natural flavoring or both. Another preferred flavoring is a fruit flavoring.

In a preferred embodiment of the confectionery of the invention, the coating agent comprises apple wax, vegetable oil, and at least one antioxidant.

Preferred vegetable oils are in particular sunflower oil, soybean oil, groundnut oil, rapeseed oil, sesame oil, safflower oil, tall oil, linseed oil, colza oil, mustard oil, olive oil, tea seed oil, corn oil, wheat germ oil, coriander oil, thistle oil, saffron thistle oil, borage oil, evening primrose oil, fennel oil or blackcurrant seed oil or a mixture of at least two of these oils, particular preference being given to the use of sunflower oil.

Examples of preferred antioxidants are butylated hydroxyanisole, butylated hydroxytoluene, guaiac resin, lecithin, nordihydroguaiaretic acid, propyl gallate, octyl gallate, dodecyl gallate, tocopherols, trihydroxybutyrophenone, ascorbic acid, ascorbyl palmitate, dilauryl thiodipropionate, distearyl thiodipropionate, monoisopropyl citrate, thiodipropionic acid, citraconic acid or a combination of at least two of these antioxidants, particular preference being given to the use of fat- or oil-soluble antioxidants such as α-tocopherol (vitamin E).

In a preferred embodiment of the confectionery of the invention, the coating agent comprises
  1% to 20% by weight, more preferably 2.5% to 17.5% by weight, and most preferably 5% to 15% by weight, of apple wax,
  50% to 98% by weight, more preferably 60% to 97% by weight, and most preferably 70% to 96% by weight, of vegetable oil, and also
  0.1% to 5% by weight, more preferably 0.25% to 2.5% by weight, and most preferably 0.5% to 1.5% by weight, of at least one antioxidant,
wherein the amounts given are in each case based on the total weight of the coating agent.

In a further preferred embodiment of the confectionery of the invention, the coating agent comprises
  1% to 20% by weight, more preferably 2.5% to 17.5% by weight, and most preferably 5% to 15% by weight, of apple wax,
  75% to 98% by weight, more preferably 80% to 97% by weight, and most preferably 83.5% to 94% by weight, of vegetable oil, and also
  0.1% to 5% by weight, more preferably 0.25% to 2.5% by weight, and most preferably 0.5% to 1.5% by weight, of at least one antioxidant,
wherein the amounts given are in each case based on the total weight of the coating agent and preferably add up to 100% by weight.

It is additionally according to the invention preferable that the confectionery contains the apple wax in an amount within a range from 0.001% to 0.1% by weight, more preferably within a range from 0.005% to 0.05% by weight, and most preferably within a range from 0.005% to 0.025% by weight, in each case based on the weight of the confectionery. In addition, it is according to the invention preferable that the confectionery comprises the coating agent in an amount within a range from 0.01% to 1% by weight, more preferably within a range from 0.05% to 0.5% by weight, and most preferably within a range from 0.1% to 0.25% by weight, in each case based on the weight of the confectionery.

The apple wax contained in the coating agent can be obtained by any process for obtaining apple wax from apple peel known to those skilled in the art. The apple wax is preferably obtainable by a process comprising the process steps of:
i) extracting a composition comprising apple peel with organic solvents, preferably with an organic solvent selected from the group consisting of alcohols, for example ethanol, ethers, hydrocarbons, halogenated hydrocarbons, for example chloroform, or a mixture of at least two thereof;
ii) at least partially evaporating the organic solvent from the extract to obtain apple wax.

A suitable composition comprising apple peel that is used in process step i) is depectinized apple pomace, which is a waste product of the pectin-producing industry. A process for producing apple wax from depectinized apple pomace is described for example in WO 93/17083 A1.

In addition, it is according to the invention preferable that the apple wax achieves at least one of the following properties, but preferably both of the following properties:
(α) a nonacosane content within a range from 10% to 50% by weight, preferably within a range from 15% to 40% by weight, and most preferably within a range from 20% to 35% by weight, in each case based on the total weight of the apple wax;
(α) an ursolic acid content within a range from 20% to 80% by weight, preferably within a range from 25% to 70% by weight, and most preferably within a range from 35% to 70% by weight, in each case based on the total weight of the apple wax.

A contribution to achieving the objects mentioned in the introduction is also made by a process for producing a confectionery comprising the process steps of
I) providing a confectionery precursor mass;
II) molding the confectionery precursor mass to obtain a confectionery precursor comprising a core and an outer surface bounding the core;
III) coating at least part of the outer surface of the core, preferably the entire outer surface of the core, with a coating agent;
characterized in that the coating agent comprises apple wax.

In process step I) of the process of the invention, a confectionery precursor mass is first provided. A confectionery precursor mass is a mass from which a confectionery can be produced by further processing. A preferred confectionery precursor mass comprises as an essential constituent a sugar or a sugar substitute or both. A preferred sugar is one selected from the group consisting of a polysaccharide, sucrose, glucose, fructose, and invert sugar or a combination of at least two thereof. A preferred sugar substitute is one selected from the group consisting of isomalt, mannitol, sorbitol, xylitol, and polydextrose or a combination of at least two thereof. Another preferred hard candy mass further comprises one selected from the group consisting of a milk preparation, a vegetable fat, an emulsifier, a color mixture, an oil, an active substance, a plant extract and a flavoring or a combination of at least two thereof. A preferred oil is an essential oil. A preferred essential oil is one selected from the group consisting of a *Eucalyptus* oil, a mint oil, and a menthol or a combination of at least two thereof. A preferred active substance has one selected from the group consisting of an expectorant effect, an analgesic effect, a swelling-relieving effect, and an anti-inflammatory effect or a combination of at least two thereof. A preferred plant extract is one selected from the group consisting of a herbal extract, a root extract, and a bark extract or a combination of at least two thereof. A preferred herbal extract is an extract from one selected from the group consisting of sage, buckhorn plantain, cowslip, and mallow or a combination of at least two thereof. A preferred root extract is licorice root extract, often referred to simply as licorice. A preferred flavoring is a synthetic flavoring or a natural flavoring or both. Another preferred flavoring is a fruit flavoring. During molding in process step II), a confectionery precursor mass preferably has a processing temperature within a range from 120 to 145° C., preferably within a range from 130 to 155° C., more preferably within a range from 140 to 160° C. The processing temperature that a confectionery precursor has during molding in process step II) is chosen such that the confectionery precursor mass is characterized by good flow properties. In this state, the confectionery precursor mass is described as liquid.

In process step II) of the process of the invention, the confectionery precursor mass is molded to obtain a confectionery precursor comprising a core and an outer surface bounding the core. In one embodiment of the process of the invention, this molding is carried out by molding the confectionery precursor mass by means of a nozzle having an outlet opening, by overlaying a substrate with the confectionery precursor mass to obtain a molded body, as described for example in WO 2016/113318 A1. In another embodiment of the process of the invention, this molding is carried out by providing a carrier holding a powder, in which the powder comprises a level powder bed, the level powder bed containing a multiplicity of negative molds, wherein, in a further process step, the negative molds are then filled with the confectionery precursor mass. Such a process is described for example in DE 10 2014 009321 A1.

Once the confectionery precursor mass has been molded, for example by means of the process described in WO 2016/113318 A1 or the process described in DE 10 2014 009321 A1, to obtain a confectionery precursor comprising a core and an outer surface bounding the core, the confectionery precursor mass is hardened, wherein the hardening may consist of drying (for example in the case of the process described in WO 2016/113318 A1) or cooling, in particular cooling by means of an active cooling process or passively or both (for example in the case of the process described in DE 10 2014 009321 A1).

Once a confectionery precursor has been obtained in the manner described above, at least part of the outer surface of the core, preferably the entire outer surface of the core, is in process step III) coated with a coating agent.

The coating of the confectionery precursor can be carried out by any method that those skilled in the art deem suitable for coating a confectionery precursor, for example a soft or hard candy, with a coating agent, preferably with a liquid coating agent. These methods can be dipping the confectionery precursor into the coating agent, spreading a coating agent on the confectionery precursor, or spraying or dripping the coating agent onto the confectionery precursor, with particular preference given to spraying with a liquid coating agent. This spraying is preferably carried out in a mixer equipped with a spray device, so that the confectionery precursors can be mixed during the spraying process and so as to ensure that the coating of the confectionery precursors with the coating agent is as uniform as possible. The temperature at which the confectionery precursor is coated with the coating agent depends in particular on the melting point of the coating agent. The temperature is chosen such that the coating agent is liquid during the spraying process and has a viscosity sufficiently low to ensure uniform spraying. In the case of fruit gums as the confectionery, the confectionery precursors are preferably coated in what is known as a waxing drum.

The process of the invention is characterized in that the coating agent comprises apple wax. In a preferred embodiment of the process of the invention, the coating agent used in process step III) comprises apple wax, vegetable oil, and at least one antioxidant.

Preferred vegetable oils are in particular sunflower oil, soybean oil, groundnut oil, rapeseed oil, sesame oil, safflower oil, tall oil, linseed oil, colza oil, mustard oil, olive oil, tea seed oil, corn oil, wheat germ oil, coriander oil, thistle oil, saffron thistle oil, borage oil, evening primrose oil, fennel oil or blackcurrant seed oil or a mixture of at least two of these oils, particular preference being given to the use of sunflower oil.

Examples of preferred antioxidants are butylated hydroxyanisole, butylated hydroxytoluene, guaiac resin, lecithin, nordihydroguaiaretic acid, propyl gallate, octyl gallate, dodecyl gallate, tocopherols, trihydroxybutyrophenone, ascorbic acid, ascorbyl palmitate, dilauryl thiodipropionate, distearyl thiodipropionate, monoisopropyl citrate, thiodipropionic acid, citraconic acid or a combination of at least two of these antioxidants, particular preference being given to the use of fat- or oil-soluble antioxidants such as α-tocopherol (vitamin E).

In a preferred embodiment of the process of the invention, the coating agent used in process step III) comprises
- 1% to 20% by weight, more preferably 2.5% to 17.5% by weight, and most preferably 5% to 15% by weight, of apple wax,
- 50% to 98% by weight, more preferably 60% to 97% by weight, and most preferably 70% to 96% by weight, of vegetable oil, and also
- 0.1% to 5% by weight, more preferably 0.25% to 2.5% by weight, and most preferably 0.5% to 1.5% by weight, of at least one antioxidant, wherein the amounts given are in each case based on the total weight of the coating agent.

In a further preferred embodiment of the process of the invention, the coating agent used in process step III) comprises
- 1% to 20% by weight, more preferably 2.5% to 17.5% by weight, and most preferably 5% to 15% by weight, of apple wax,
- 75% to 98% by weight, more preferably 80% to 97% by weight, and most preferably 83.5% to 94% by weight, of vegetable oil, and also
- 0.1% to 5% by weight, more preferably 0.25% to 2.5% by weight, and most preferably 0.5% to 1.5% by weight, of at least one antioxidant, wherein the amounts given are in each case based on the total weight of the coating agent and preferably add up to 100% by weight.

It is additionally according to the invention preferable that the apple wax is used in an amount within a range from 0.001% to 0.1% by weight, more preferably within a range from 0.005% to 0.05% by weight, and most preferably within a range from 0.005% to 0.025% by weight, in each case based on the weight of the confectionery. In addition, it is according to the invention preferable that the coating agent is used in an amount within a range from 0.01% to 1% by weight, more preferably within a range from 0.05% to 0.5% by weight, and most preferably within a range from 0.1% to 0.25% by weight, in each case based on the weight of the confectionery.

Particularly suitable apple waxes are those apple waxes that have already been described above as preferred apple waxes in connection with the confectionery of the invention.

A contribution to achieving the object mentioned in the introduction is also made by a confectionery, preferably a soft candy or a hard candy, obtainable by the process of the invention, preferably obtained by the process of the invention.

A contribution to achieving the object mentioned in the introduction is additionally made by the use of apple wax as a coating agent or as a constituent of a coating agent for coating confectioneries, preferably for the production of soft candies or hard candies. Preferred apple waxes are again those apple waxes that have already been described in the introduction as preferred apple waxes in connection with the sugar candy of the invention.

EXAMPLES

The invention will now be described hereinbelow with reference to examples and drawings, without the examples and drawings signifying any restriction of the invention.

Example 1—Gelatin-Based Fruit Gum

Example 1 relates to the production according to the invention of a confectionery of the invention in the form of a gelatin-based fruit gum.

First, a powder box was provided as a carrier for a molding powder. The molding powder used was a cornstarch having a water content of 4.5 to 8.0 g per 100 g based on the cornstarch. The powder box was filled with the cornstarch and this was drawn off to a level cornstarch bed in the powder box. A molding die made of plaster/stainless steel was provided for stamping negative molds for the candy molding. The molding die consisted of a holding part and another part having the positive shape of a candy to be produced. The lower die surface of the molding die that is pressed into the powder during stamping, here corresponds to the top surface of the fruit gum to be produced. This die surface includes a relief. The relief is a three-dimensional portrayal of part of the surface of a strawberry. The molding die was used to stamp negative molds by pressing into the cornstarch bed. The negative molds were stamped in an even distribution over the cornstarch bed, the molding die being pressed into the cornstarch bed only so deep that at least 1 cm of cornstarch remained under each negative mold. After each stamping, the molding die was removed vertically upwards without damaging the stamped negative mold.

A recipe for a fruit gum precursor mass was then assembled by weighing out the raw materials. The recipe consisted of
- 44% by weight of sucrose having a purity of 99.5%, a pH of 7, a sweetness of 100, and EC category I;
- 31% by weight of glucose syrup, the syrup used being a DE 42 SE, pH 4.8 to 5.3, dry substance approx. 80% by weight of the glucose syrup, wherein the dry substance comprises 6% by weight of dextrose, 37% by weight of maltose, and 57% by weight of polysaccharide, in each case based on the dry substance;
- 17% of water meeting the requirements of the Drinking Water Ordinance;

6% by weight of gelatin, comprising 84% to 86% protein, 9% to 12% water, 2% to 4% minerals, in each case based on the gelatin.

1.5% by weight of acid, citric acid monohydrate, residual water 8.6% by weight based on the acid, acidity 90, inversion rate 0.64;

0.25% by weight of coloring, from fruit extracts; and 0.25% by weight of flavoring, natural flavoring from fruits as a concentrate;

in each case based on the recipe.

The gelatin was thereafter dissolved in water in accordance with the recipe and a gelatin solution obtained. The sucrose of the recipe was then added to a copper pan of sufficient volume and the sucrose was dissolved at 110° C. The glucose syrup was then added and the resulting solution underwent final boiling to 116° C. in the copper pan while stirring continuously with a mixing spoon. The boiling time was about 8 minutes. The mass was then allowed to stand without input of heat and thus cooled to about 90° C. At this temperature, the gelatin solution, coloring, flavoring, and acid were added in accordance with the recipe and stirred in, affording a soft candy precursor mass. To allow it to degas, the fruit gum precursor mass was left to rest for 10 minutes. The fruit gum precursor mass was then transferred to a pouring bag. The pouring bag was used to fill the negative molds in the cornstarch produced as described above by pouring with the fruit gum precursor mass. During pouring, the fruit gum precursor mass had a temperature of approx. 70° C. Filled negative molds were obtained. The fruit gum precursor mass was matured in the negative molds in the powder box in the drying room for 48 hours at a temperature of 30° C., affording fruit gum precursors. The powder box was then inverted so that the soft candy precursors produced were demolded from the negative molds, which resulted in the fruit gum precursors and cornstarch dropping from the powder box onto a mesh screen. Excess cornstarch was removed from the fruit gum precursors by shaking the mesh screen for 1 minute. The mesh screen chosen here was one with which the soft candy precursors remained on the mesh screen and the cornstarch particles fell through the screen and could be collected in a container beneath. The fruit gum precursors were additionally blown clean with compressed air.

Example 2—Starch-Based Fruit Gum

Example 2 relates to the production according to the invention of a confectionery of the invention in the form of a starch-based vegan fruit gum.

First, a powder box is provided as a carrier for a molding powder. The molding powder used is a cornstarch having a water content of 5 to 9 g per 100 g based on the cornstarch. The powder box is filled with the cornstarch and this is drawn off to a level cornstarch bed in the powder box. A molding die made of plaster/stainless steel is provided for stamping negative molds for the candy molding. The molding die consists of a holding part and another part having the positive shape of a fruit gum to be produced. The lower die surface of the molding die that is pressed into the powder during stamping here bears a relief. The relief is a three-dimensional portrayal of part of the surface of a strawberry. The molding die is used to stamp negative molds by pressing into the cornstarch bed. The negative molds are stamped in an even distribution over the cornstarch bed, the molding die being pressed into the cornstarch bed only so deep that at least 1 cm of cornstarch remains under each negative mold. After each stamping, the molding die is removed vertically upwards without damaging the stamped negative mold.

First, a recipe for a fruit gum precursor mass is assembled by weighing out the raw materials. The recipe consists of
35.0% by weight of sucrose,
45.0% by weight of HM (=high maltose) glucose syrup from Cargill Inc.,
16.05% by weight of modified starches,
2.0% by weight of fruit juice concentrate,
0.30% by weight of flavorings,
0.3% by weight of fruit/plant concentrates,
1.2% by weight of acids (citric, malic, and lactic acids),
0.15% by weight of release wax, and
recipe water in a ratio of 1:0.8 to the sucrose.

The above raw materials sucrose, modified starches, recipe water, and the glucose syrup are then mixed in. This mixture is boiled in a heating coil at a temperature of approx. 125 to 130° C. and a counterpressure of approx. 5 bar. The vapor formed by the boiling mixture is dissipated in the vapor-separating space. The outlet to the vacuum vessel is regulated by means of a needle valve. In the vacuum vessel, the sugar mass undergoes a further reduction in water content and is at the same time cooled to approx. 90 to 95° C. The mass is continuously withdrawn from the vacuum vessel by means of a pump. The fruit juice concentrates, the fruit/plant concentrates, the flavorings, and the acids are added to the fruit gum mass in accordance with the recipe, stirred in, and a fruit gum precursor mass is thus produced.

The fruit gum precursor mass is transferred to a pouring bag. The pouring bags are used to fill the negative molds in the cornstarch produced as described above by pouring with the fruit gum precursor mass. During pouring, the precursor mass has a temperature of approx. 70 to 80° C. Filled negative molds are obtained. The poured masses are in the negative molds in the powder box in the drying room for 48 hours at a temperature of 40° C. The powder box is then inverted so that the fruit gum precursors produced are demolded from the negative molds. The fruit gum precursors and cornstarch drop from the powder box onto a mesh screen. Excess cornstarch is removed from the fruit gum precursors by shaking the mesh screen for 1 minute. The mesh screen chosen here is one with which the fruit gum precursors remain on the mesh screen and the cornstarch particles fall through the screen and can be collected in a container beneath. The fruit gum precursors are additionally blown clean with compressed air.

The fruit gum precursors from examples 1 and 2 thus obtained were then coated/waxed in a waxing drum with 0.15% by weight, based on the total weight of the soft candy precursors, of a coating agent containing 7.5% by weight of apple wax (obtained according to the procedure in example 1 on page 13 of WO 93/17083 A1), 91.75% by weight of sunflower oil, and 0.75% by weight of α-tocopherol. This is done by rotating the untreated products in a waxing drum with continuous infeed of the coating agent while transporting them forward at the same time. The rubbing together of the products distributes the coating agent on the surface and the fruit gums from example 1 and 2 are waxed/sealed.

Comparative Example 1—Gelatin-Based Fruit Gum

A gelatin-based fruit gum was produced according to example 1, but with the coating agent containing the same amount of beeswax instead of the apple wax.

Comparative Example 2—Starch-Based Fruit Gum

A starch-based fruit gum was produced according to example 2, but with the coating agent containing the same amount of beeswax instead of the apple wax.

Compared to the beeswax-coated fruit gums from comparative example 1 and 2, the fruit gums coated with apple wax from examples 1 and 2 showed improved gloss and a reduced tendency to stick to one another after prolonged storage.

Example 3—Comparison Between Apple Wax and Beeswax/Carnauba Wax

Fruit gums (Katjes "Glücksherzen") were coated with the same amount of coating agent (comprising wax, sunflower oil, and antioxidant (α-tocopherol)). This is done by rotating the untreated products in a waxing drum with continuous infeed of the coating agent. The rubbing together of the products distributes the coating agent on the surface. The treated fruit gums are then stored at 20° C. for 4 weeks and afterwards assessed for flowability on a scale from 1 to 5 (where "5" means best and "1" poorest).

| Wax | Amount of coating agent applied (g/kg) | Mixing time in the drum (min) | Flowability |
|-----|-----|-----|-----|
| AW  | 0.9 | 5 | 5 |
| AW  | 1.2 | 5 | 5 |
| BW  | 0.9 | 5 | 4-5 |
| BW  | 0.9 | 8 | 4-5 |
| BW  | 1.2 | 3 | 4-5 |
| BW  | 1.2 | 5 | 5 |
| CW  | 0.9 | 5 | 4-5 |
| CW  | 0.9 | 8 | 4-5 |
| CW  | 1.2 | 5 | 4-5 |
| CW  | 1.2 | 8 | 4-5 |
| CW  | 1.5 | 5 | 4-5 |
| CW  | 1.5 | 8 | 4-5 |
| CW  | 1.8 | 5 | 5 |
| BCW | 0.9 | 5 | 4-5 |
| BCW | 0.9 | 8 | 4-5 |
| BCW | 1.2 | 5 | 4-5 |
| BCW | 1.2 | 8 | 4-5 |
| BCW | 1.5 | 5 | 5 |

AW = apple wax;
CW = carnauba wax;
BCW = mixture of beeswax and carnauba wax

It was found that dosing apple wax at 0.9 g/kg of coating agent for 5 min in the drum affords results equally good as those obtained with a coating agent comprising beeswax when dosing with 1.2 g/kg of coating agent for 5 min in the drum, with a coating agent comprising carnauba wax when dosing with 1.8 g/kg of coating agent for 5 min in the drum, and with a coating agent comprising a beeswax-carnauba wax mix when dosing with 1.5 g/kg of coating agent for 5 min in the drum. Comparably good results are thus achieved using less raw material and with shorter treatment times. The gloss was comparably good in all samples.

Figure 1:
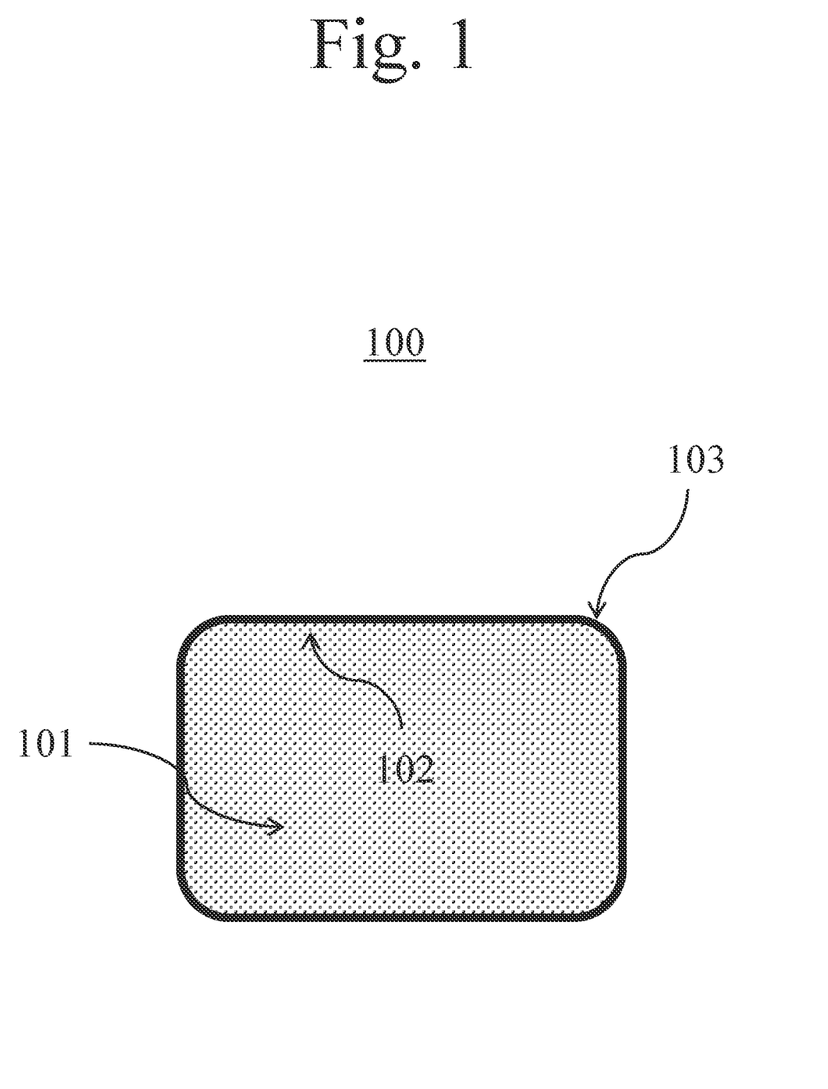
FIG. 1 shows a confectionery of the invention in cross section.

FIG. 1 shows a confectionery of the invention 100 in the form of a candy in cross section. The confectionery or candy 100 comprises a core 101 and an outer surface 102 bounding the core 100, which as shown in FIG. 1 is coated completely with a coating agent 103 comprising apple wax, oil, and antioxidant.

Figure 2:
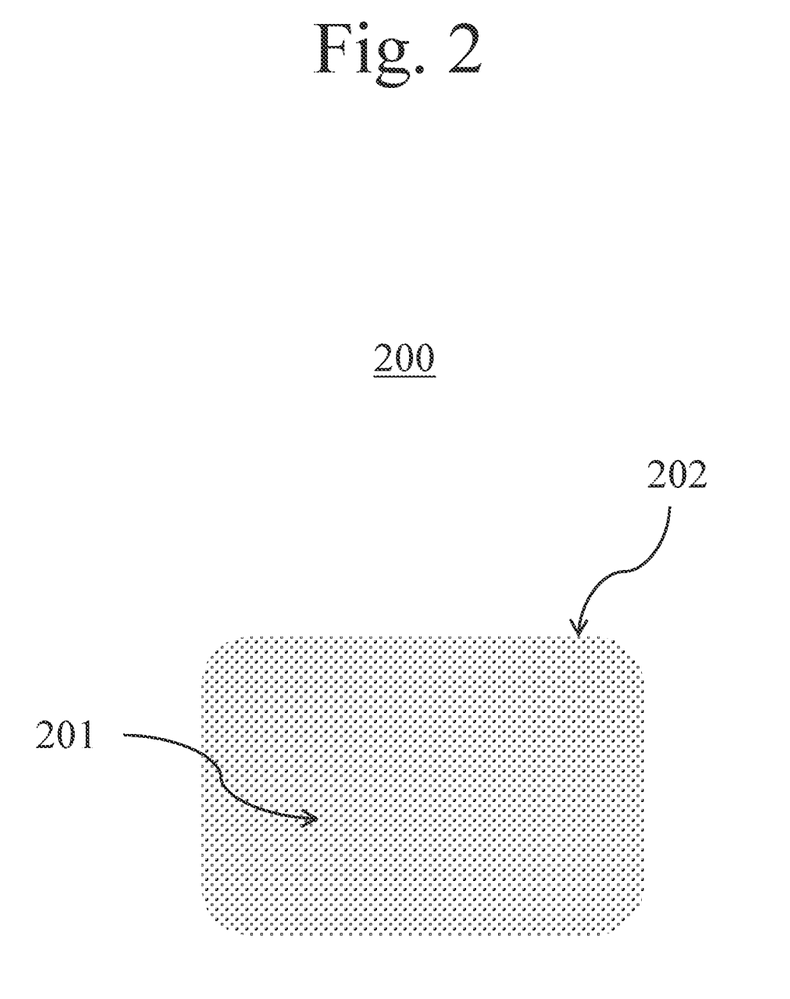
FIG. 2 shows a confectionery precursor prior to coating with a coating agent in cross section.

FIG. 2 shows a confectionery precursor 200, as is obtainable after process step II) of the process of the invention. The confectionery precursor comprises a core 201 and an outer surface 202 bounding the core 201.

Figure 3:
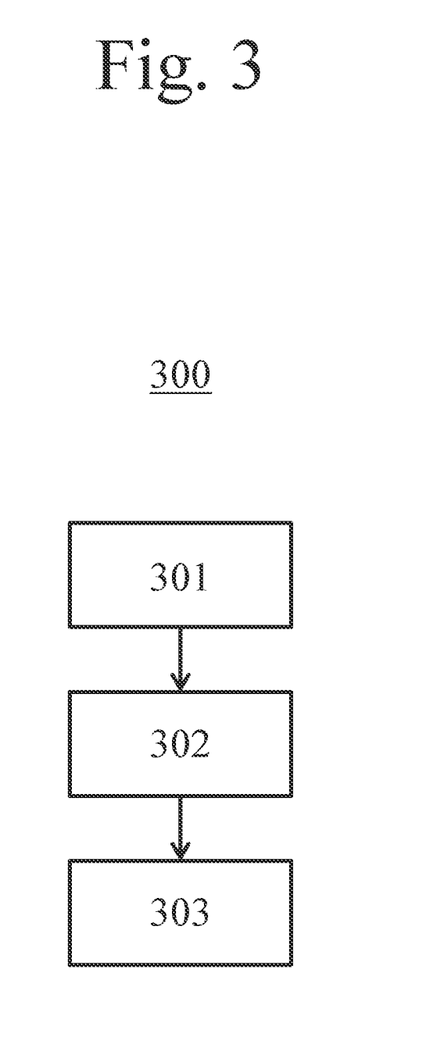
FIG. 3 shows a schematic representation of the process of the invention for producing a confectionery.

FIG. 3 shows a flowchart of a process of the invention 100 for producing a confectionery 100. In process step I) 301, a confectionery precursor mass is first provided. In process step II) 302, the confectionery precursor mass is then formed to obtain a confectionery precursor 200 shown in FIG. 2 comprising a core 201 and an outer surface 202 bounding the core 201. This process step can for example comprise the introduction of the confectionery precursor mass into a corresponding negative mold and the subsequent hardening of the confectionery precursor mass in the mold by cooling to obtain a confectionery precursor 200 or transforming the confectionery precursor mass into the desired shape by means of 3D printers, followed by hardening by drying to obtain a confectionery precursor 200. In process step III) 303, at least part of the outer surface 202 of the confectionery precursor 200, preferably the entire outer surface of the core 201, is coated with a coating agent 103 comprising apple wax. This coating can for example be carried out by waxing the confectionery precursors 200 in a suitable mixing device with the coating agent, which is present in liquid form.

LIST OF REFERENCE NUMBERS

100 Confectionery of the invention
101 Core
102 Outer surface
103 Coating agent
200 Confectionery precursor
201 Core
202 Outer surface
300 Process
301 Process step I)
302 Process step II)
303 Process step III)

The invention claimed is:

1. A confectionery comprising a core and an outer surface bounding the core, wherein at least part of the outer surface of the core is coated with a coating agent, characterized in that the coating agent comprises apple wax, and wherein the coating agent comprises
   1% to 20% by weight of apple wax,
   50% to 98% by weight of vegetable oil, and
   0.1% to 5% by weight of at least one antioxidant,
in each case based on the total weight of the coating agent.

2. The confectionery according to claim 1, wherein the confectionery is a hard candy or a soft candy.

3. The confectionery according to claim 1, wherein the confectionery contains apple wax in an amount within a range from 0.001% to 0.1% by weight based on the weight of the confectionery.

4. The confectionery according to claim 1, wherein the apple wax is obtainable by a process comprising the process steps of:
   i) extracting a composition comprising apple peel with organic solvents;
   ii) at least partially evaporating the organic solvent from the extract to obtain apple wax.

5. The confectionery according to claim 4, wherein the composition comprising apple peel is depectinized apple pomace.

6. The confectionery according to claim 4, wherein the organic solvent is selected from the group consisting of alcohols, ethers, hydrocarbons, halogenated hydrocarbons, or a mixture of at least two thereof.

7. The confectionery according to claim 1, wherein the apple wax achieves at least one of the following properties:
   (α) a nonacosane content within a range from 10% to 50% by weight based on the total weight of the apple wax;
   (β) an ursolic acid content within a range from 20% to 80% by weight based on the total weight of the apple wax.

\* \* \* \* \*